United States Patent [19]

Nowicke

[11] Patent Number: 4,987,937
[45] Date of Patent: Jan. 29, 1991

[54] IN-TIRE FILTER ASSEMBLY FOR CENTRAL TIRE INFLATION SYSTEM

[75] Inventor: John H. Nowicke, Marshall, Mich.

[73] Assignee: Eaton Corporation, Cleveland, Ohio

[21] Appl. No.: 374,793

[22] Filed: Jul. 3, 1989

[51] Int. Cl.$^5$ .......................... B60C 7/24; B60C 15/02; B60C 29/06

[52] U.S. Cl. .................. 152/400; 152/379.3; 152/381.5; 152/416; 137/550

[58] Field of Search .............. 152/415, 416, 417, 427, 152/428, 391, 396, 539, 381.5, 381.6, 382, 383, 388, 399, 400, 401, 379.3, 380.5; 137/225, 230, 550; 141/38, 39, 40, 41, 42, 95

[56] References Cited

U.S. PATENT DOCUMENTS

| | | | |
|---|---|---|---|
| 4,103,282 | 7/1978 | Cook | 340/58 |
| 4,470,506 | 9/1984 | Goodell et al. | 152/417 |
| 4,651,792 | 3/1987 | Taylor | 152/415 |
| 4,734,674 | 3/1988 | Thomas et al. | 200/61.25 |

FOREIGN PATENT DOCUMENTS 564607 6/1957 Italy .................................. 152/415

Primary Examiner—Michael W. Ball
Assistant Examiner—Gregory J. Wilber
Attorney, Agent, or Firm—C. H. Grace

[57] ABSTRACT

A tire filter assembly (15, 400) for a central tire inflation system (10) having fluid communication (403) from the exterior to the interior of the pressurized chamber (74) of an inflatable tire (12). The assembly includes filter means (15) mounted to a cylindrical sleeve-type bead lock (400) inside the interior pressurized tire chamber (74). The location of the filter inside the tire permits it to have a relatively large area through which air can flow, and to prevent rubber particles that come off the inside of the tire from entering the central inflation system. The filter assembly is affixed by means of an adhesive (11) or a molding material to a groove (17) provided in the bead lock, and/or by mechanical means.

5 Claims, 4 Drawing Sheets

| | HIGHWAY | OFF-ROAD | SAND-MUD-SNOW |
|---|---|---|---|
| MAX. PRESS. (PSI) | 75 | 30 | 20 |
| MAX. SPEED (MPH) | 50-60 | 30 | 10-15 |
| FOOTPRINT | | | |

IN-TIRE FILTER ASSEMBLY FOR CENTRAL TIRE INFLATION SYSTEM

BACKGROUND OF THE INVENTION

1. Field of the Invention

The invention relates to on-board central tire inflation systems (CTIS), for vehicles, by which the inflation pressure of the tires can be controlled from a remote location such as the cab. A CTIS enables the inflation pressure to be changed manually and/or automatically even when the vehicle is moving, utilizing an on-board source of compressed air or other fluid.

2. Description of the Prior Art

Central tire inflation systems are well known in the prior art, as shown by U.S. Pat. Nos. 2,634,782; 2,976,906; 2,989,999; 3,099,309; 3,102,573; 3,276,502; 3,276,503; 4,313,483; 4,418,737; 4,421,151; 4,434,833, and 4,724,879, which are incorporated herein by reference.

The traction of vehicles on soft terrain such as mud, sand or snow can be greatly improved by decreasing the inflation pressure of the tires; the contact area between the tires and the terrain (called the "footprint") enlarges. Decreasing the inflation pressure from that used on smooth highways also increases the riding comfort on rough roads. On the other hand, greater tire pressures, which are satisfactory for smooth roads, reduce the rolling resistance and tire carcass temperatures, increasing economy and safety.

A capability for changing the tire inflation pressure from within the cab of a cross country vehicle is especially useful for military trucks. They often travel in caravans in which stopping of one vehicle would delay others. If a tire were to be damaged by gunfire or the like, it might be partially inflatable so that the vehicle could continue. CTISs are very advantageous systems that are likely to be used much more in the future.

Prior art CTISs are not totally satisfactory, however, because their fluid valves, especially those near the tires, can be fouled by particles of rubber or dust that come up from inside the tires, especially during deflation operation.

SUMMARY OF THE INVENTION

The present invention relates to a filter assembly that is mounted inside a tire on a bead lock, at an air passage through which the inflation pressure is changed. The filter prevents rubber particles from passing from the tire to the valves and other components of the CTIS.

Accordingly, it is an object of the present invention to provide a new and improved filter assembly for a CTIS.

Another object is to provide a filter in a location where the filter can be of a much larger area, so that it does not become clogged with accumulated rubber particles.

Other objects of the invention will become apparent from a description and drawings of the preferred embodiment.

DESCRIPTION OF THE PREFERRED EMBODIMENT

Figure 1:
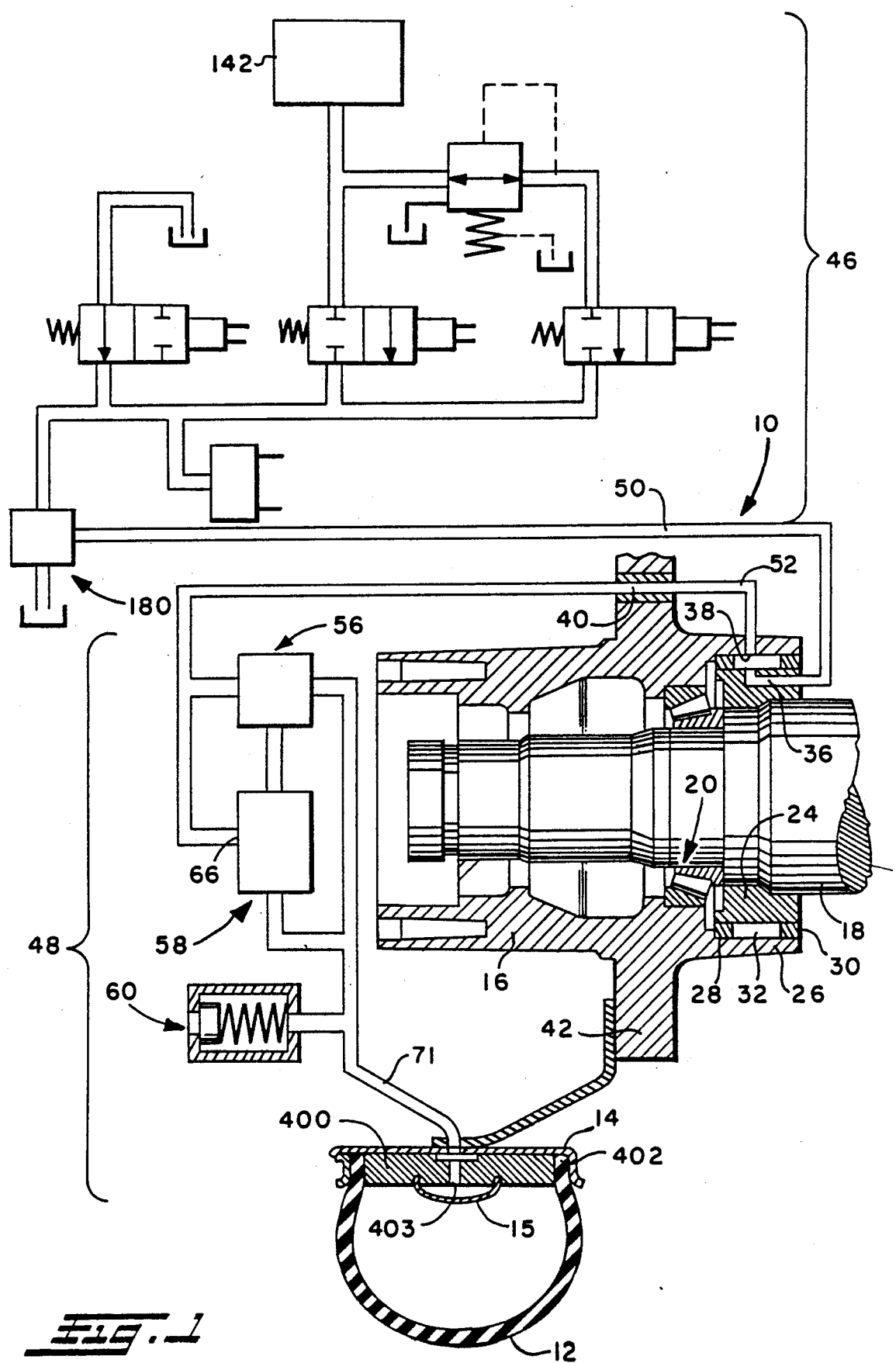
FIG. 1 is a schematic illustration of the pneumatic components of a CTIS as utilized to control the inflation of a single tire.

An inflatable tire 12 is mounted to a tire rim 14 (FIG. 1), which is fixed to a wheel hub assembly 16 rotationally supported on the outer end of an axle housing 18 by bearings 20. An axle shaft (not shown), rotationally driven by conventional means such as a differential, extends from the axle housing 18. It typically includes a flange (not shown) for drivingly connecting the axle shaft to the wheel hub.

An annular sleeve 24 is pressed to the axle housing at a location inboard of the bearings 20. The wheel hub 16 includes an inboardly-extending sleeve-type annular flange 26 that telescopically surrounds the sleeve 24. A pair of rotary seals 28 and 30 extend radially between the outer surface of sleeve 24 and the inner surface of sleeve-type flange 26 to define a sealed annular chamber 32 between them.

Sleeve 24 is provided with a passage 36 opening to the chamber 32. The sleeve-type flange 26 has a radially extending passage 38 from its exterior outer diameter surface to the sealed annular chamber 32. A passage 40 is provided in the radial flange portion 42 of the wheel hub 16 for a pressure conduit.

The pneumatic components of the CTIS system 10, as utilized to control the inflation pressure of a single tire 12, are also shown in FIG. 1. The CTIS is a controller that preferably includes a microprocessor. It senses the tire inflation value selected by the operator, the vehicle's velocity, and the current pressures of the vehicle's air brake system and the inflation system's reservoir. The controller includes control valves that make fluid connections to the tire to measure its existing pressure and to inflate or deflate it as required. The CTIS 10 has a stationary portion 46 (top half of FIG. 1), fixed to the vehicle chassis and a rotational portion 48 (bottom half of FIG. 1), fixed to the wheel hub 16 and tire 12.

The relatively stationary portion 46 is fluidly connected to the rotational portion 48 by means of the annular chamber 32 defined by the rotary seals 28 and 30. A fluid conduit 50 leading from the rotary seals 28, 30 is connected to a source 142 of pressurized fluid through a number of control valves such as valve 180. The fluid conduit 50 from the stationary portion 46 is connected to the passage 36 formed in sleeve 24. The source 142 is typically the vehicle's air system compressor or a reservoir supplied by the compressor. The rotating portion 48 of system 10 includes a low-pressure shut-off valve 56, a control valve 58, and a manual inflate and pressure check valve 60. A fluid conduit 52 leading to the rotational portion 48 is connected to the passage 38 formed in flange 26 and passes through the opening 40 in the flange 42 of the hub 16. A fluid feed line 71 is attached to the rim 14.

Preferably, the operator is provided with a control panel 222 (FIG. 2) preferably mounted in the vehicle's dashboard. A push button 226 is marked "highway", a push button 228 is marked "cross country", a push button 230 is marked "sand, mud" and a push button 232 is marked "off". The equipment described above is not part of the present invention.

Under normal steady state conditions, i.e. when the CTIS 10 is not activated, the interior chamber 74 of tire 12 is at some pressure greater than a predetermined minimum pressure level. During automatic periodic monitoring of current operating pressures, or when the operator selects an inflation pressure, the control unit measures the tire pressures to determine if further inflation and/or deflation are required.

If, based upon a comparison of the measured pressure and the desired pressure, the system control unit determines that inflation or deflation of the tires is required, the system 10 assumes an inflation or deflation mode of operation, respectively.

Figures 2, 3:
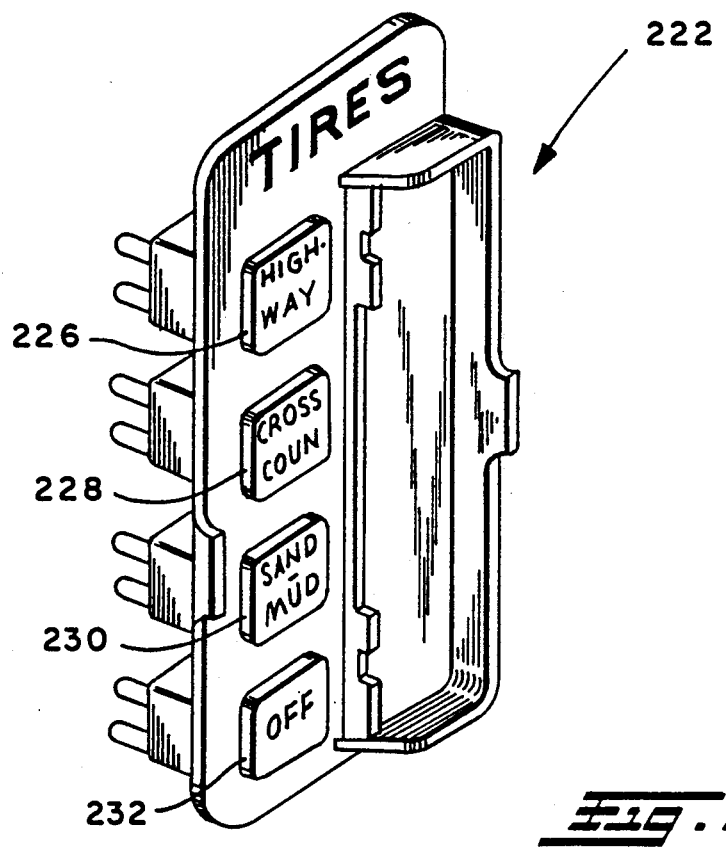
FIG. 2 is a view of an operator's control panel.
FIG. 3 is a table of tire "footprints" at different tire inflation pressures.

An effect of varying the inflation pressure of the tires is shown in FIG. 3. Assume that the vehicle's rear drive axle tires are inflated to about 75 psi (pounds per square inch) for highway operation; decreasing the tire inflation pressure to about 30 psi for cross country travel over rough roads or to about 20 psi for operation in sand, mud or snow results in greater contact area, as shown by the tire footprints of FIG. 3.

Figure 4:
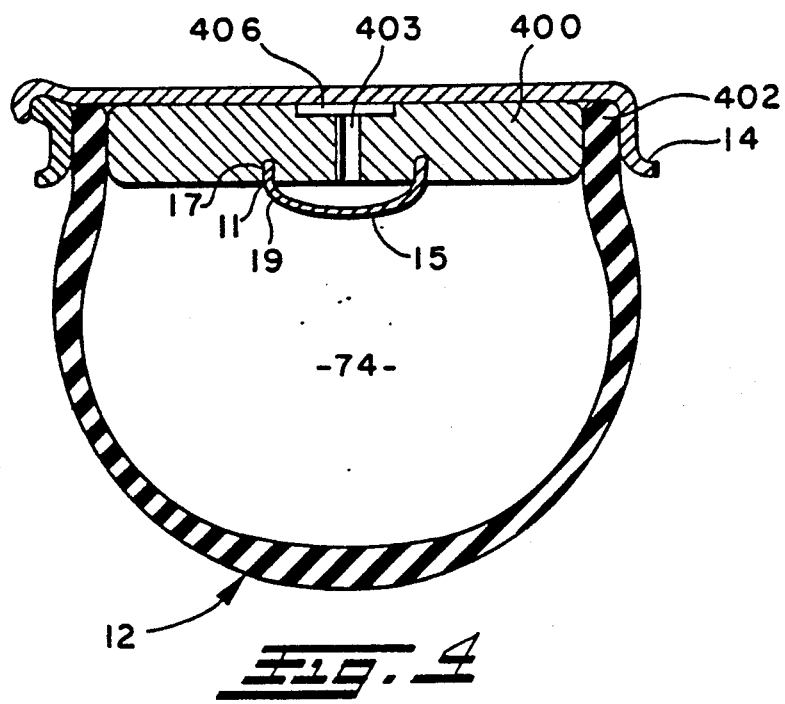
FIG. 4 is a sectional view (perpendicular to the plane of the wheel) of the invented filter as assembled to a bead lock, along with a tire and a wheel rim.
Figure 5:
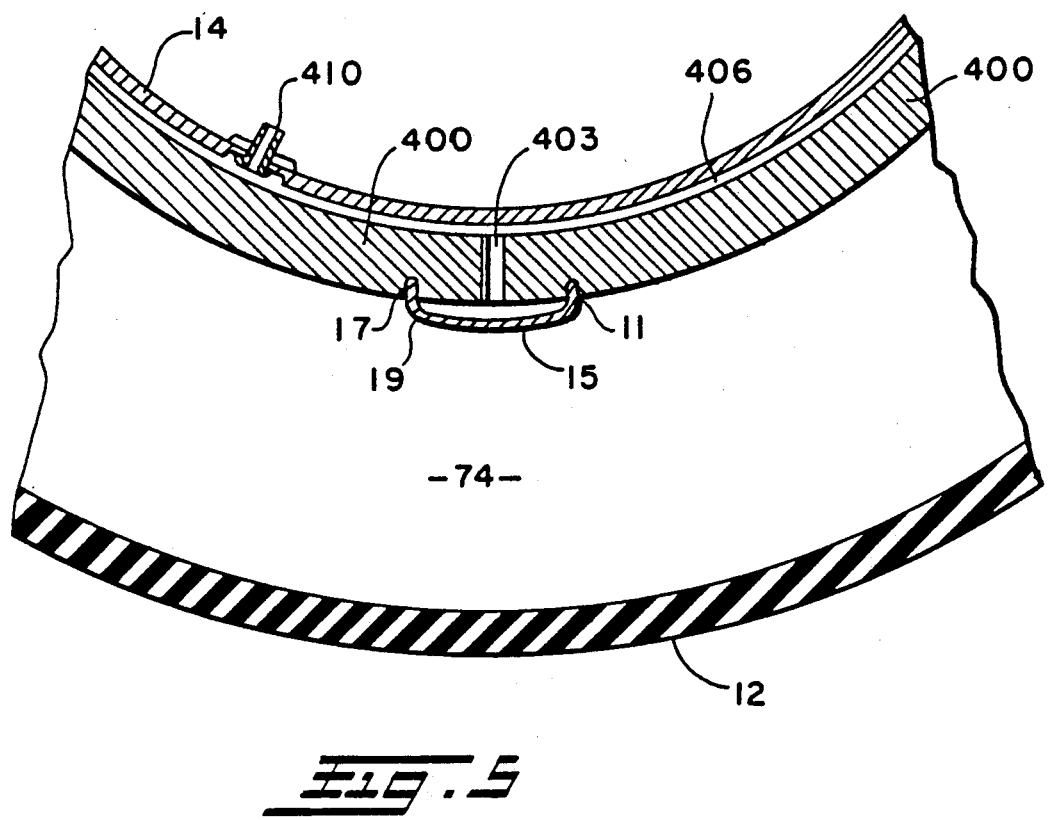
FIG. 5 is a sectional view (parallel to the plane of the wheel) of the filter as assembled to a bead lock, along with a tire and a wheel rim.

FIGS. 4 and 5 show the location of the invented filter assembly 15. A bead 402 of the tire 12 is engaged by a bead lock 400. Bead locks, which are well known in the prior art, are often utilized with tires expected to be operated at relatively low pressures. They maintain the bead portion 402 sealingly engaged with the rim 14 to prevent the tire from spinning on the rim. The illustrated bead lock 400, which is about 1 inch thick, is available from the Hutchinson Core Corp. of Trenton, N.J., and is of a molded rubber sleeve construction.

An annular channel 406 is provided in the bead lock 400 at its inner diameter (hence outside the pressurized chamber 74 of the tire). It communicates fluidly with a passage 403 of about ½ inch diameter extending radially through the bead lock, which connects the channel 406 with the interior chamber 74 of the tire. The annular channel 406 and the radial passage 403 are in the prior art. The purpose of the radial passage 403 is to provide a flow path for fluid between the interior chamber 74 of the tire and the annular channel 406. The purpose of the annular channel 406 is to provide a fluid flow path between the radial passage 403 and the fluid feedline 71 and the manual fitting 410. The prior art does not include the grooves 17 or 401, nor the lip portion 405. (A fitting 410 is shown extending through an opening in rim 14 for manual inflation and deflation of the tire.)

The tire filter assembly 15 is preferably made of a nylon or other screen material that interdicts particles that would be large enough to interfere with the valves of the CTIS if permitted to reach them. The best screen density varies in dependence upon the particular size of rubber particles that occur in tires of each type of tire and vehicle application. A preferred supplier is ITW Deltar Corporation, having a place of business on Civic Center Drive in Southfield, Mich. Another suitable filter material is a mass of nylon threads or other filaments, bunched together to form a pad similar to a steel wool pad.

The filter 15 is preferably fabricated in the shape of a circular portion of the surface of a sphere, but other shapes are usable also. A welt or ring 19 of rubber compound or plastic is preferably molded to the peripheral edge of the screen or pad 15 to facilitate its handling and mounting.

The filter assembly 15 is then mounted to the bead lock 400, preferably by being affixed in a groove 17 in the bead lock. The groove 17 describes a generally circular pattern on the in-tire surface of the bead lock. The groove facilitates positioning and retaining the filter in place at the passage 403. Alternatively, the groove could be omitted and the filter affixed to the smooth surface of the bead lock by cement or other means. Moreover, if the assembly has no bead lock device the filter 15 can be cemented to the rim of the wheel at the air passage. The air passage 403 would then be in the rim. The area of filter available for air flow should be as large a percentage as possible of the total filter area to prevent blockage by accumulation of rubber particles. The available air-transmission area of the filter 15 is preferably at least four times as great as the cross-sectional area of the passage 403. The preferred filter is convex as viewed from the center of the pressurized volume 74 of the tire. Accumulated particles will tend to be blown off of the filter during pressurization to provide a self-cleaning function.

The filter assembly is held in place by being molded into the bead lock with an adhesive material 11 or molding compound that engages both the peripheral welt 19 of the filter and the groove 17. The preferred adhesive material is known as RTV Silicone Rubber Adhesive Sealant, manufactured by HI-Tec Industries of Bloomington, Ind. Initially it has a viscosity similar to that of room-temperature Vaseline. After being applied it cures at room temperature. Other adhesives or molding materials, such as moldable rubber, may be employed for affixing the filter 15 to the bead lock device 400.

Figure 6:
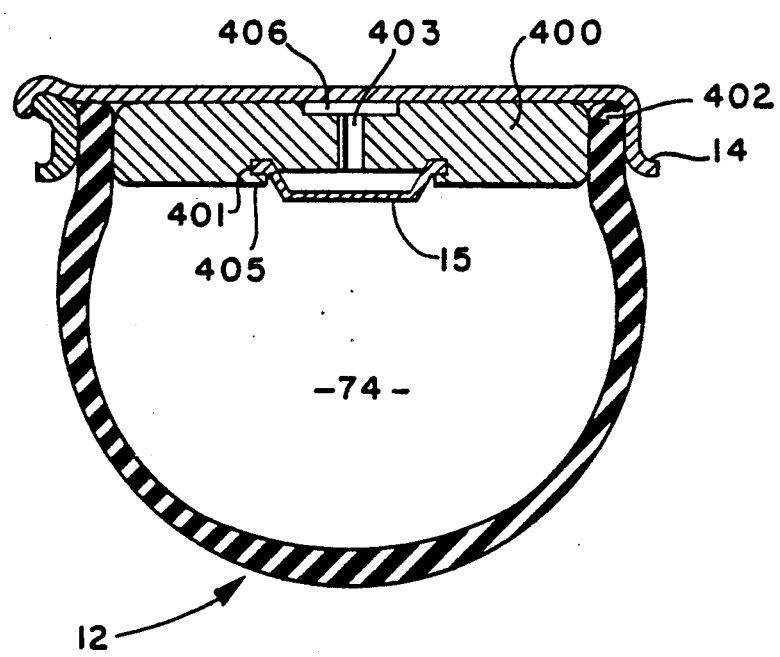
FIG. 6 is a sectional view of a mechanical means for affixing the filter to the bead lock.

An alternative embodiment using mechanical retention means obviates the use of adhesive for affixing the filter 15 to the bead lock device 400. Any of many forms of mechanical retention could be used. For example, in FIG. 6, an undercut groove 401 has an L-shaped cross section. It has a portion 405 that is of smaller diameter than the outside diameter of the filter 15. Resilience of the filter 15 and the bead lock 400 enables installation, and the portion 405 retains the filter in place thereafter. Adhesive could be used in addition if desired.

Although only a few preferred embodiments of the present invention have been described, other embodiments in which certain features are different would be within the scope of the present invention as claimed.

I claim:

1. An in-tire filter assembly for a central tire inflation system (10) that has a fluid feed line (71) and a tire (12), comprising:

a bead lock (400) assembled to said tire and having a passage (403, 406) therethrough for fluid communication between the pressurized chamber (74) of said tire and said fluid feed line (71);

a filter (15) inside the tire affixed to the bead lock and having a transmission area so that fluid passing through the passage also passes through the filter;

said transmission area of said filter (15) being at least four times as great as the cross-sectional area of said passage (403, 406);

means for retaining said filter comprising a groove (17) configured in the in-tire surface of said bead lock (400), and adhesive material (11) engaging, at least at said groove, both said filter (15) and said bead lock.

2. A filter assembly as in claim 1 and wherein said adhesive material (11) comprises moldable adhesive material.

3. A filter assembly as in claim 1 and wherein said filter (15) further comprises a welt (19) at its periphery.

4. An in-tire filter assembly for a central tire inflation system (10) that has a fluid feed line (71) and a tire (12), comprising:
- a bead lock (400) assembled to said tire and having a passage (403, 406) therethrough for fluid communication between the pressurized chamber (74) of said tire and said fluid feed line (71);
- a filter (15) located inside the tire affixed to the bead lock and having a transmission area so that fluid passing through the passage also passes through the filter, wherein said transmission area is at least four times as great as the cross-sectional area of said passage (403, 406);
- said filter (15) further comprising a welt (19) at its periphery;
- means for retaining said filter comprising undercut groove means (401) configured in the in-tire surface of said bead lock (400) and having a portion (405) of smaller diameter than said filter to accommodate said welt for affixing said filter (15) to said bead lock.

5. A filter assembly as in claim 4 and further comprising adhesive material (11) engaging both said filter (15) and said bead lock.

* * * * *